Dec. 2, 1947.  W. L. KEEHN  2,432,018
TRAILER AND SWINGABLE AXLE CONSTRUCTION THEREFOR
Filed Dec. 28, 1944  2 Sheets-Sheet 1
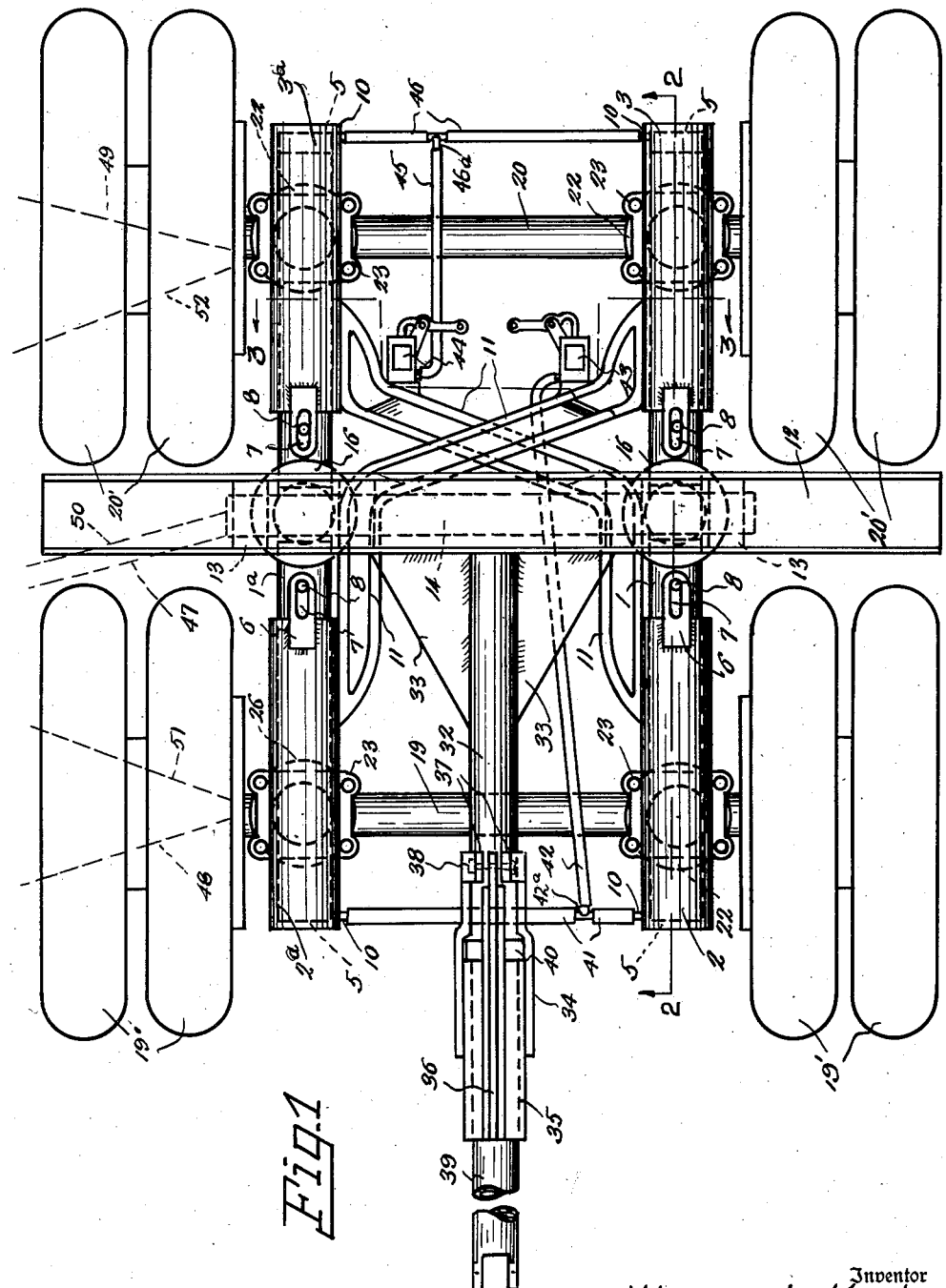
Fig. 1
Inventor
Warner L. Keehn
By
Attorney.

Dec. 2, 1947.   W. L. KEEHN   2,432,018
TRAILER AND SWINGABLE AXLE CONSTRUCTION THEREFOR
Filed Dec. 28, 1944   2 Sheets-Sheet 2
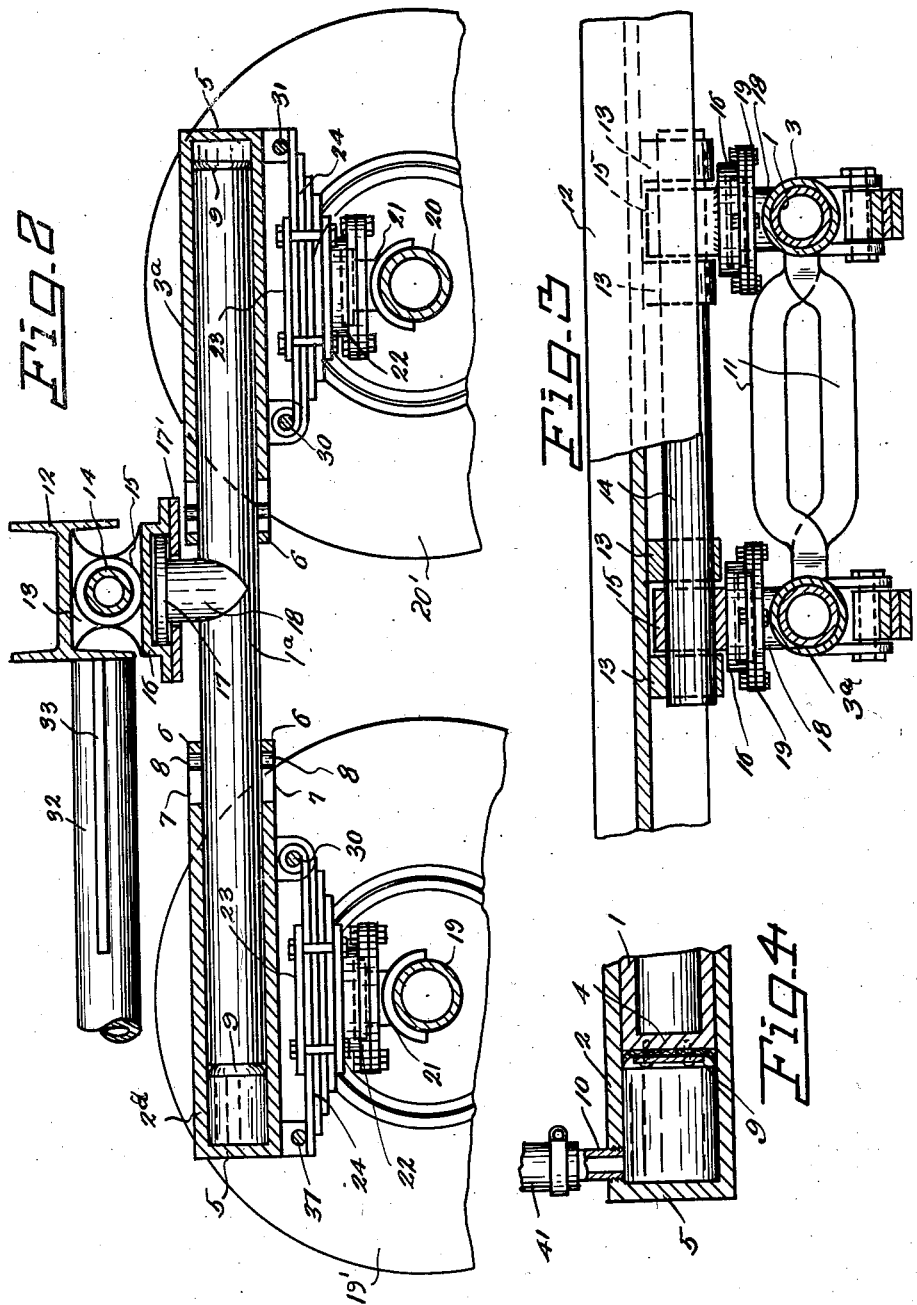
Inventor
Warner L. Keehn
By
Glenn L. Fish
Attorney Patented Dec. 2, 1947

2,432,018

UNITED STATES PATENT OFFICE 2,432,018

TRAILER AND SWINGABLE AXLE CONSTRUCTION THEREFOR

Warner L. Keehn, Spokane, Wash.

Application December 28, 1944, Serial No. 570,204

7 Claims. (Cl. 280—100)

This invention relates to a trailer and more particularly to a trailer of the type employed for moving vans and other large vehicles.

One object of the invention is to provide a trailer of such construction that when a van is supported upon the trailer and in use, it may be drawn forwardly or backed and the wheels of the trailer so maneuvered that turns may be made without likelihood of the van or truck running over a curb.

Another object of the invention is to provide a trailer wherein the front and rear axles are mounted for swinging movement horizontally about vertical axes relative to springs carried by cylinders which slidably receive end portions of side bars of the trailer and are connected by pipe lines so that when liquid in the pipe lines and outer end portions of the cylinders is subjected to pressure, swinging movement will be imparted to the axles to steer the trailer.

Another object is to provide an arrangement of side bars and cylinders wherein the side bars may be shifted longitudinally in the cylinders for steering the trailer, sliding movement of the side bars relative to the cylinders being limited so that excessive movement will not take place.

Still another object is to provide the trailer with an arrangement of side bars and cylinders wherein the front cylinders are each connected with a rear cylinder at the opposite side of the trailer and thus cause the axles to be swung in opposite directions when steering the trailer around a turn in a road or around a corner from one street to another.

And still another object of the invention is to provide a trailer which is simple in construction, very strong, and efficient in operation.

In the accompanying drawings:

Fig. 1 is a top plan view of the improved trailer.

Fig. 2 is a longitudinal sectional view on the line 2—2 of Fig. 1.

Fig. 3 is a transverse sectional view on the line 3—3 of Fig. 1.

Fig. 4 is a fragmentary sectional view taken longitudinally through the outer end portion of a cylinder and the end portion of the side beam received therein.

This improved trailer has side beams or bars 1 and 1a about which fit front and rear cylinders 2 and 2a and 3 and 3a. The side beams are preferably hollow and closed at each end by heads 4, but it will be understood that they may be of solid formation if desired. Outer ends of the cylinders are closed by heads 5 and, at their inner ends, the cylinders carry tongues 6 which project from the cylinders longitudinally thereof and are formed with slots 7 to receive pins or lugs 8 carried by the side beams and limit sliding movement of the beams and the cylinders relative to each other. Cups 9 of the type used upon pistons of reciprocating pumps are mounted against ends of the side beams and, from an inspection of Figs. 2 and 4, it will be seen that since ends of the side beams are spaced from outer ends of the cylinders, pumping action may take place for forcing liquid through nipples 10 projecting laterally from the cylinders. Cross bars 11 which extend diagonally in crossed relation to each other and have their front ends and rear ends welded to companion front and rear cylinders cause the cyilnders to be connected in pairs and move together as a unit. It should be noted that each cross bar connects a front cylinder with a diagonally opposed rear cylinder at the opposite side of the trailer and that the crossed portions of the bars 11 are bent as shown in Fig. 3, so that they will be out of contact with each other and permitted to move freely.

A cross beam 12 having the form of a strong I-beam, extends transversely of the trailer across the side beams midway the length thereof and this cross beam serves as a support for the body of a van or large truck. Bearing brackets 13 extend downwardly from the cross beam to receive a shaft 14 which also passes through bearings 15 projecting upwardly from housings 16 which rotatably enclose circular heads or disks 17 at upper ends of posts 18 rising from the side beams. Plates 17' hold the heads 17 in the housings and from an inspection of Fig. 2, it will be seen that when the beam is swung in a horizontal plane, the heads will turn in the housings and allow one side bar to be shifted forwardly while the other side bar moves rearwardly. When forward pull is exerted upon the bunk, or rearward thrust exerted, the two side beams will be shifted longitudinally equally.

The front and rear axles 19 and 20, upon which are mounted wheels 19' and 20', extend transversely of the trailer under the cylinders and each carries near its ends saddles 21 having upstanding posts corresponding to the posts 18 and having heads at their upper ends rotatably received in housings 22. The housings 22 correspond to the housings 16 and are secured by shackles 23 to springs 24 which extend longitudinally of the cylinders in downwardly spaced relation thereto and have their upper leaves pivoted at one end for vertical swinging movement, as shown at 30, and their other ends engaging abutments or rods 31 along which they may slide while the springs are absorbing shocks received when the trailer is moving along a rough road.

A tongue 32 projects forwardly from the cross beam midway the length thereof and is braced by triangular webs 33. This tongue carries a cradle 34 which projects forwardly from the front end and, in the cradle, is a sleeve 35 pivotally mounted for vertical tilting movement and carrying a strip 36 which projects rearwardly therefrom and engages between ears 37 of the cradle where it is releasably secured by a removable pin 38. A draft bar 39 slidably passes through the sleeve and has a collar 40 about its rear end to engage the rear end of the sleeve and limit forward movement of the draft bar therethrough. When the pin 38 is in place, the sleeve and draft bar will be held in alinement with the tongue 32, but when the pin is removed, the sleeve may tilt downwardly at its front end and the draft bar slide rearwardly through the sleeve and permit the trailer to be tilted upwardly.

Hose pipes 41 have outer ends connected with the nipples 10 of the front cylinders 2 and 2a and inner ends of these pipes are connected with a pipe 42 by a coupling 42a. The hose pipe extends rearwardly of the trailer from the coupling and has its rear end connected with a reservoir 43 near one side of the trailer. A second reservoir 44 is mounted near the other side of the trailer and from this reservoir extends a hose pipe 45 having its rear end connected with hose pipes 46 by a coupling 46a, the outer ends of the pipes 46 being connected with the nipples of the rear cylinders 3 and 3a. Movement of the side bars or pistons toward closed outer ends of the cylinders will apply pressure to oil in the end portions of the cylinders and in the hose pipes and the reservoirs whereas movement of the pistons away from the closed ends of the cylinders will serve to create suction and draw oil into the cylinders. When forward pull is exerted upon the draft bar 39 the cross bar 14 and the side bars or pistons 1 and 1a will be urged forwardly and since pressure will be applied to oil in the front end of these cylinders they will be carried forwardly with the pistons and the front axle held at right angles to the bars 1 and 1a. The pins remain at rear ends of the slots formed in the tongue 6 of the front cylinders and since these cylinders are connected with the diagonally opposed rear cylinders by the bars 11 the rear axle will also be held at right angles to the bar 39 and the wheels 19' and 20' all move forwardly in a straight line. The same action takes place when the trailer is being backed except that the pressure will be applied to oil in rear ends of the rear cylinder. It will thus be seen that during forward movement or backing of the trailer cylinders, the side beams or pistons engaged therein will act as units and the trailer have movement forwardly or rearwardly in a straight line.

When the draft bar 39 is turned in the direction of the lower corner of the sheet for making a left turn, pressure is applied to beam 1 rearwardly and simultaneously, forward pressure is applied to beam 1a. Since pin 8 will not allow beam 1 to be moved rearwardly without the movement of sleeve 2, they are moved at the same time, and since the sleeve 3a is connected with sleeve 2 by a cross bar 11 this causes sleeve 3a to also move rearwardly. With the pressure on beam 1a in a forwardly direction, sleeve 3a may not move rearwardly while beam 1a moves forwardly, unless fluid is allowed to enter the cylinder or sleeve 3a through hose pipe 46. Likewise beam 1 may not enter sleeve 3 unless fluid is removed from cylinder or sleeve 3 through hose pipe 46. Therefore fluid is forced from sleeve 3 into sleeve 3a thus allowing for the movement. The fluid in cylinders 2 and 2a remains under pressure prohibiting movement between the beams and the sleeves 2 and 2a. During this action the forward pressure on beam 1a moves sleeve 2a and sleeve 3 forwardly, thus distributing the movement evenly between all the axle pivoting points 23, and causing the axles to assume angles approximating dotted lines 48 and 49. Of course when the draft bar is moved in the opposite direction the steering will be accomplished by reversing the movements above described, and the axles will assume the angles indicated by the dotted lines 51 and 52.

What is claimed is:

1. A trailer comprising a frame including side beams and cylinders slidably fitting about front and rear ends of the side beams, said cylinders being closed at their outer ends and the side beams constituting pistons having pump cups at their ends, springs carried by said cylinder, front and rear axles extending transversely of the trailer and connected with the springs by members permitting horizontal swinging movement of the axles about vertical axes, means for circulating liquid between end portions of said cylinders, bars connecting the front cylinders with rear cylinders at opposite sides of the trailer, a cross beam extending transversely of the trailer and across said side beams and connected with the side beams for horizontal swinging movement about vertical axes, and means extending forwardly from said cross beam for connection with a towing vehicle.

2. A trailer comprising a frame including side beams and cylinders slidably fitting about front and rear ends of the side beams, said cylinders being closed at their outer ends and the side beams constituting pistons having pump cups at their ends, front and rear axles extending transversely of the trailer under said cylinders and mounted for horizontal swinging movement about vertical axes relative to the cylinders for steering the trailer, bars extending diagonally between the side beams in crossed relation to each other and connecting the front cylinders with rear cylinders at opposite sides of the trailer, a cross beam extending transversely of the trailer over the side beams and connected with the side beams between inner ends of said cylinders for horizontal swinging movement about vertical axes to effect longitudinal movement of the side beams and the cylinders relative to each other and swing the axles about their vertical pivots, and means for circulating liquid between outer end portions of said cylinders to control longitudinal movement of the cylinders along the side beams.

3. A trailer comprising a frame including side beams and cylinders slidably fitting about front and rear ends of the side beams, said cylinders being closed at their outer ends and the side beams constituting pistons having pump cups at their ends, front and rear axles extending transversely of the trailer under said cylinders and mounted for horizontal swinging movement about vertical axes relative to the cylinders for steering the trailer, bars extending diagonally between the side beams in crossed relation to each other and connecting the front cylinders with rear cylinders at opposite sides of the trailer, a cross beam extending transversely of the trailer over the side beams and connected with the side beams between inner ends of said cylinders for horizontal swinging movement about vertical axes to effect longitudinal movement of the side beams and the cylinders relative to each other and swing the axles about their vertical pivots, slotted tongues extending from inner ends of said cylinders, pins carried by said side beams and passing through the slots of said tongues to limit longitudinal sliding of the cylinders and the side beams relative to each other, and means for supplying liquid to fill space in the cylinders between their outer ends and ends of the side beams.

4. A trailer comprising a frame including side beams and cylinders slidably fitting about front and rear ends of the side beams, said cylinders being closed at their outer ends and the side beams constituting pistons having pump cups at their ends, front and rear axles extending transversely of the trailer under said cylinders and mounted for horizontal swinging movement about vertical axes relative to the cylinders for steering the trailer, bars extending diagonally between the side beams in crossed relation to each other and connecting the front cylinders with rear cylinders at opposite sides of the trailer, a cross beam extending transversely of the trailer over the side beams and connected with the side beams between inner ends of said cylinders for horizontal swinging movement about vertical axes to effect longitudinal movement of the side beams and the cylinders relative to each other and swing the axles about their vertical pivots, means for limiting sliding of the side beams and the cylinders relative to each other, reservoirs for liquid, and pipe lines connecting one reservoir with front ends of the front cylinders and the other reservoir with rear ends of the rear cylinders.

5. A trailer comprising a frame including side beams and cylinders slidably fitting about front and rear ends of the side beams, said cylinders being closed at their outer ends and the side beams constituting pistons having pump cups at their ends, front and rear axles, said axles extending transversely of the trailer under said cylinders and mounted for horizontal swinging movement about vertical axes relative to the cylinders for steering the trailer, bars extending diagonally between the side beams in crossed relation to each other and connecting the front cylinders with rear cylinders at opposite sides of the trailer, a support for a vehicle body extending across portions of the side beams between said cylinders and connected therewith for swinging movement horizontally above vertical axes, liquid reservoirs, and pipe lines connecting said reservoirs with outer end portions of the cylinders.

6. A trailer comprising a frame including side beams, front and rear cylinders extending longitudinally of said beams and closed at their outer ends, and said beams having piston elements at their front and rear ends operating in said cylinders, front and rear axles extending transversely of the trailer under said cylinders, means connecting said axles with said cylinders, and permitting horizontal swinging movement of the axles about vertical axes under the cylinders, means connecting each front cylinder with a rear cylinder at the opposite side of the trailer, a cross beam extending transversely of the trailer and across portions of said side beams between inner ends of said cylinders and pivotally connected with the side beams for swinging movement about vertical axes, and means carried by said cross beam for connection with a towing vehicle.

7. In a trailer, front and rear axles, front and rear cylinders extending longitudinally of the trailer across said axles and having their inner ends spaced from each other, pivotal connections between the axles and the cylinders crossing the same mounting the axles for horizontal swinging movement about vertical axes, pistons extending longitudinally of the trailer and slidable longitudinally in the front and rear cylinders through inner ends thereof, means for circulating fluid between outer ends of the cylinders, and a cross beam extending transversely of the trailer with portions crossing portions of the pistons between spaced ends of the front and rear cylinders and pivotally connected with the pistons to mount the cross beam for horizontal swinging movement about vertical axes relative to the pistons.

WARNER L. KEEHN.

REFERENCES CITED

The following references are of record in the file of this patent:

UNITED STATES PATENTS

| Number | Name | Date |
|---|---|---|
| 2,330,557 | Collis | Sept. 28, 1943 |
| 1,868,912 | Plank | July 26, 1932 |
| 679,493 | Belknap | July 30, 1901 |
| 610,921 | Ricks | Sept. 20, 1898 |